(12) United States Patent
Suber, III et al.

(10) Patent No.: US 7,697,035 B1
(45) Date of Patent: Apr. 13, 2010

(54) ROTATING CAMERA ATTACHMENT

(75) Inventors: Edward H. Suber, III, 2400 Romig Rd., Suite 135, Akron, OH (US) 44322; Dana Hawes, Richmond, VA (US)

(73) Assignee: Edward H. Suber, III, Akron, OH (US)

( * ) Notice: Subject to any disclaimer, the term of this patent is extended or adjusted under 35 U.S.C. 154(b) by 778 days.

(21) Appl. No.: 11/505,153

(22) Filed: Aug. 16, 2006

Related U.S. Application Data

(63) Continuation-in-part of application No. 11/098,962, filed on Apr. 5, 2005, now abandoned.

(60) Provisional application No. 60/560,366, filed on Apr. 8, 2004.

(51) Int. Cl.
*H04N 5/232* (2006.01)
*H04N 5/225* (2006.01)

(52) U.S. Cl. .................. 348/211.99; 348/373; 348/376; 348/211.2; 348/211.8

(58) Field of Classification Search .................. 348/373, 348/376, 211.99, 211.2, 211.8
See application file for complete search history.

(56) References Cited

U.S. PATENT DOCUMENTS

| | | | | |
|---|---|---|---|---|
| 5,418,567 A | * | 5/1995 | Boers et al. ................. | 348/375 |
| 5,923,364 A | * | 7/1999 | Rhodes et al. .............. | 348/159 |
| 6,477,918 B2 | * | 11/2002 | Sakamoto .................... | 74/640 |
| 6,503,000 B1 | * | 1/2003 | Kim ............................ | 396/427 |
| 6,628,338 B1 | * | 9/2003 | Elberbaum et al. .......... | 348/373 |
| 7,071,591 B2 | * | 7/2006 | Hovanky et al. ....... | 310/154.25 |
| 2004/0141071 A1 | * | 7/2004 | Liu .............................. | 348/239 |
| 2006/0023113 A1 | * | 2/2006 | Lin .............................. | 348/373 |
| 2006/0067672 A1 | * | 3/2006 | Washisu et al. ............. | 396/351 |
| 2006/0087560 A1 | * | 4/2006 | Moran et al. ............. | 348/207.1 |
| 2007/0019077 A1 | * | 1/2007 | Park ...................... | 348/211.99 |

\* cited by examiner

*Primary Examiner*—Lin Ye
*Assistant Examiner*—Amy Hsu
(74) *Attorney, Agent, or Firm*—Edward H. Suber, III

(57) ABSTRACT

The present invention relates generally to a rotatable camera attachment and, more particularly to a rotatable lens system that works in conjunction with after-market digital and video cameras by means of a corresponding electronic device. The rotatable camera attachment comprises a lens that rotates 360° horizontally and 180° vertically to simultaneously capture the images surrounding a primary image recorded with the conventional camera. The electronic device is provided as a means to process the images so they can be viewed together. The instant abstract is neither intended to define the invention disclosed in this specification nor intended to limit the scope of the invention in any way.

14 Claims, 4 Drawing Sheets

ROTATING CAMERA ATTACHMENT

RELATED APPLICATIONS

This is a continuation-in-part of U.S. patent application Ser. No. 11/098,962 having a filing date of Apr. 5, 2005 now abandoned and which claims priority off U.S. Provisional Patent No. 60/560,366 filed on Apr. 8, 2004, both of which are incorporated by reference as if fully rewritten herein.

BACKGROUND OF THE INVENTION

1. Field of the Invention

The present invention relates generally to a rotating camera attachment and, more particularly, to a rotatable lens system that works in conjunction with after-market digital and video cameras by means of a corresponding electronic device.

2. Description of the Related Art

Special events have been captured ever since film-based cameras were introduced to the market nearly 100 years ago. The recent advent of digital cameras and digital camcorders enhances a person's ability to easily and inexpensively capture events in more striking detail. One disadvantage to this technology is that a person is only able to partially capture a moment based on a very limited field of view typical of most cameras. A standard camera affords its viewer only a 90° field of view while a wide-angled camera can approach a 150° field at best.

The limited fields adequately allow a viewer to record a particular object within view, but they prevent the viewer from simultaneously recording the events that occur around and the ones that react to the primary object. Accordingly, there is a long-felt need for a means to capture and to simultaneously display a primary object and the supporting objects in the periphery and the background. A means that accomplishes the dual-recordings in an easy and an effective manner will provide later viewers a stronger impression of an event captured with even greater accuracy.

The present invention provides such a means. A search of the prior art revealed no patents that read on the claims of the present invention; however the following references were related:

U.S. App. No. 2003/0165344 to Becker et al. teaches a means in which indicia on a mask are viewable to a user depending on what operating mode the camera is in;

U.S. Pat. No. 3,816,842 to Glaros et al. teaches an automatic camera that simultaneously takes a picture while providing the information with which the picture is identified;

U.S. Pat. No. 3,903,537 to Ettischer teaches an alternately moveable pair of lenses having a longer focusable lens and a shorter fixed-focus lens;

U.S. Pat. No. 4,527,874 to Ohmura teaches a side-by-side dual lens pair having a long focus lens and a short focus lens;

U.S. Pat. No. 4,772,903 to Labaziewicz and U.S. Pat. No. 4,801,958 to Stoneham both teach a dual lens pair having a long and a short focus lens selectively for telephoto and wide angle photography;

U.S. Pat. No. 4,816,849 to Harris et al. teaches a security camera that can photograph a person and the person's documentation in a single exposure;

U.S. Pat. No. 5,084,721 to Burnham teaches a pivotable camera lens carrier with alternative taking lenses;

U.S. Pat. No. 5,475,419 to Carbery teaches a system to display a three-dimensional video image by means of a dual-lensed camera that generates signals to represent a subject from each of two different perspectives;

U.S. Pat. No. 5,678,088 to Fuss teaches a method to advance photographic film on a dual-lens camera by means of aligning unexposed film with each lens;

U.S. Pat. No. 5,721,973 to Mizukawa teaches a telescope lens and a standard lens comprised on a camera to provide a means for telescope and wide-angle photgraphing;

U.S. Pat. No. 5,852,753 to Lo et al. teaches a dual-lens camera that comprises shutters, wherein a first shutter is released to take a two dimensional photo with a first lens and the second shutter is released to take a three dimensional photo with dual lenses;

U.S. Pat. No. 6,101,334 to Fantone teaches a dual focal length camera compacted by means of four mirror arrangements; and, U.S. Pat. No. 6,351,291 to Asano teaches an image processing apparatus that comprises a first memory to store background image data and a second memory to store on-screen display image data.

International Patents 0 324 424 A1, 0 325 140 A1 (Europe) and GB 2 257 597 (United Kingdom) are also considered related.

There is presently no technology that achieves the objects of the present invention.

SUMMARY OF THE INVENTION

It is an object of the present invention to provide a means for an event or an object to be captured while the background objects or the supporting objects surrounding the primary object are simultaneously captured. It is an object that a dual-lens camera or camcorder accomplishes the foregoing object, wherein the first lens is a wide-angled lens that captures a primary object in a manner similar to that well known in the camera arts. A second, rotating lens captures the events surrounding the primary object so that a viewer receives a greater impression.

It is an object that the second lens is rotatable 360° so that images can be captured simultaneously to the front and to the rear of a camera, e.g., a parent may capture his or her child hitting a home run while simultaneously capturing the crowds reaction, a person can capture a bride's and a groom's first dance while simultaneously capturing the guests celebration, etc.

It is an object that the images captured in both lenses are shown by means of a dual-split screen or a picture-in-picture screen display. Therefore, the present invention provides a means for a camera to act as two cameras that combine to display images on one screen.

It is a further object of the present invention that the second lens is a rotatable lens that is adapted to attach to after-market cameras so that a person may easily secure it to an existing camera and convert it to a dual-lens recording system at the times he or she desires. It is an object that the present invention is not so obtrusive, complex or expensive that it makes it an unattractive means to capture a special event.

It is a final object of the present invention to provide all of the advantages the foregoing objects entail.

BRIEF DESCRIPTION OF THE DRAWINGS

The advantages and the features of the present invention will become better understood with reference to the following and more detailed description and the claims taken in conjunction with the accompanying drawings, in which like elements are identified with like symbols, and in which:

DESCRIPTION OF THE PREFERRED EMBODIMENTS

1. Detailed Description of the Figures

Figure 1:
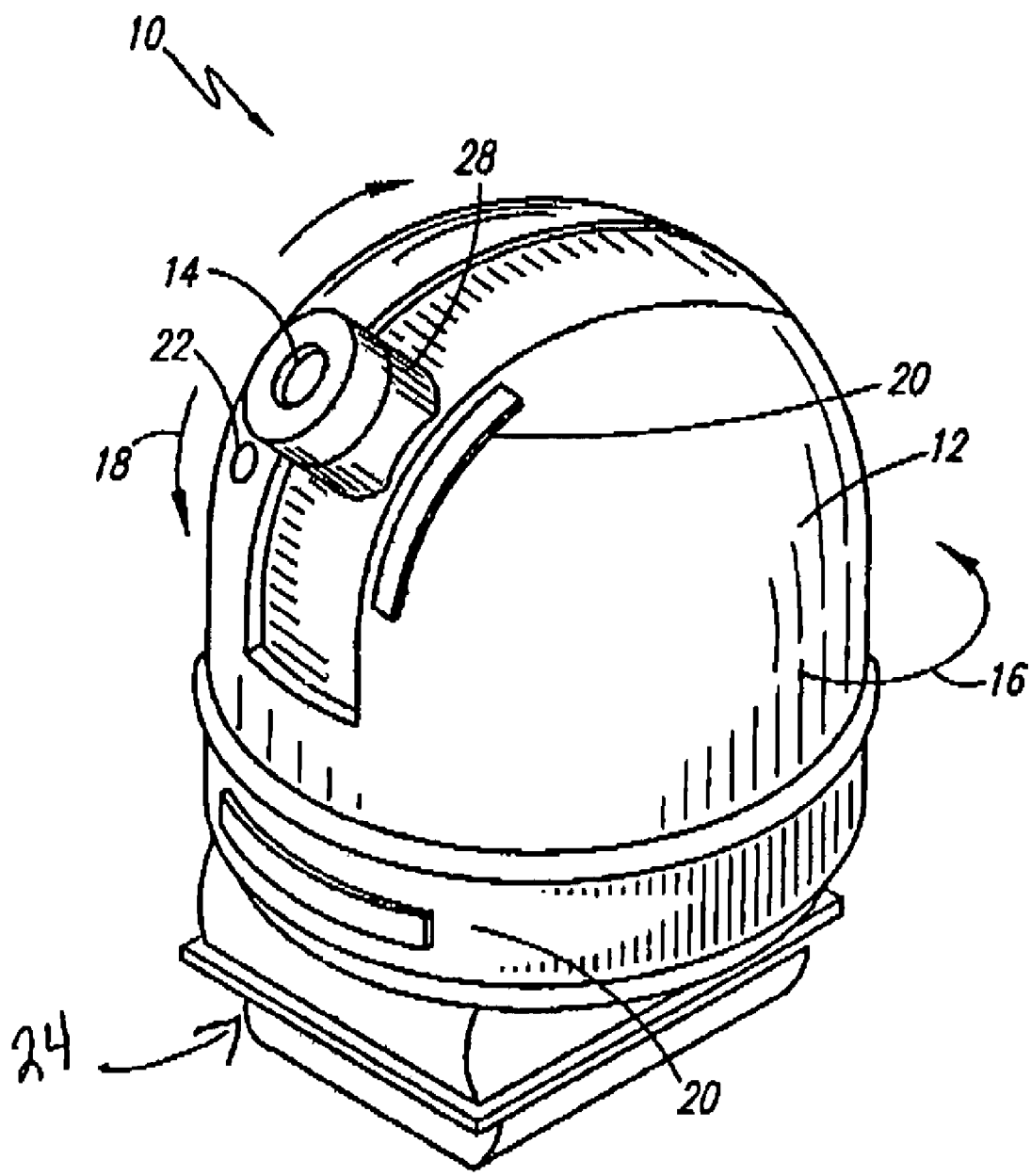
FIG. 1 is a perspective view of a rotating camera attachment according to the preferred embodiment of the present invention shown directly attachable to a camera "hot-shoe" receptacle.

A rotating camera attachment 10 is shown in FIG. 1, wherein the camera attachment 10 is contained in a housing 12 directly attached to a camera (not shown). The camera attachment 10 comprises a lens 14 that perceives information most preferably in the form of light or infrared information. In its exemplary embodiment, it is preferred that the camera attachment 10 function in a manner similar to that of a typical camera. It is possible that the camera rather function as a still picture camera, a data receiver or any other means of perception.

The camera attachment 10 has the capability to rotate 360° in a horizontal direction, as shown in the figure by the representative arrow 16. The camera attachment 10 has the additional capability to rotate 180° in a vertical direction, as similarly shown by representative arrow 18. It is preferred that the camera attachment 10 rotate to an approximate 180° to facilitate a proper connection to another device.

The camera attachment 10 may comprise a means to emit light 20. The means to emit light 20 is shown on the housing 12 in FIG. 1, but it or a second means may optionally be located at the base of the housing 12. It is envisioned that the means to emit light 20 may be, but is not limited to, a flash bulb.

The camera attachment 10 may further comprise a means to record sound, e.g., the microphone 22 shown in FIG. 1.

The camera attachment 10 comprises a means to transmit (not shown) the information perceived by the rotatable lens 14. The transmission means may include the means to record sound 22. It is preferred that the camera attachment 10 comprise a means to secure 24 it to a camera. In its most preferred embodiment, the securement means 24 corresponds to a means comprised on the camera to receive it. The securement means 24 may be in the form of an extension that extends from the housing 12 or a separate unit that attaches to the housing 12. The camera attachment 10 is capable of functioning separate from a camera, wherein the information it perceives is sent over the open air to an independent electronic device. It is envisioned that the securement means 24 is adapted to make the act of recording easier on the individual utilizing the dual lenses. The camera attachment 10 may also record while detached from any electronic device.

The rotating camera attachment 10 is typically attached to a recording device (not shown), such as a camcorder or a surround sight reception unit. It is preferred that the rotating camera attachment 10 is a consumer product utilized for amateurs recording events in a local environment; however, the rotating camera attachment 10 is equipped with the means to be utilized in a professional environment, such as in a surveillance environment set up by law enforcement.

Figure 2:
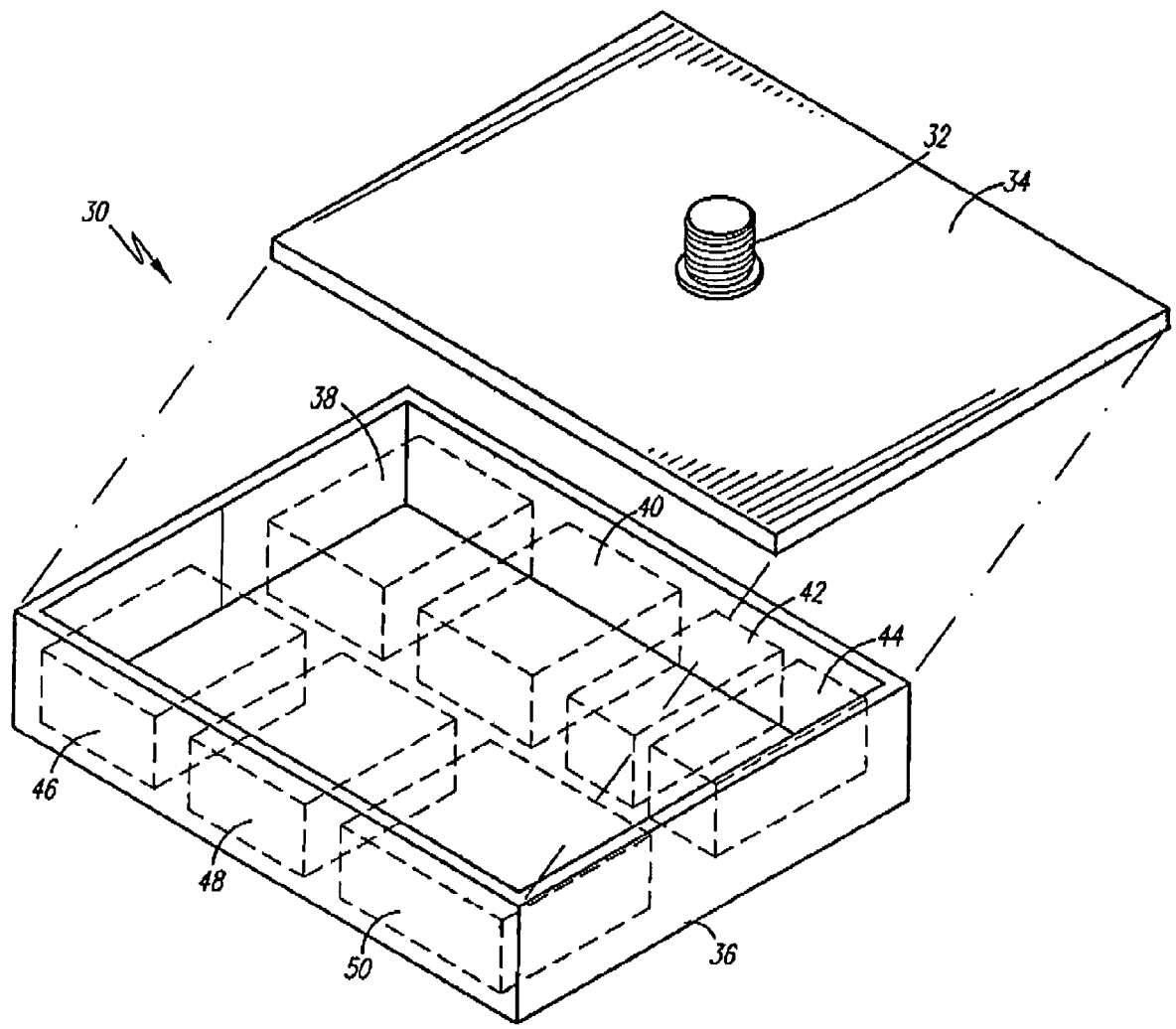
FIG. 2 is a partially exploded perspective view of an electronic receiver unit for use with the present device.
Figure 3:
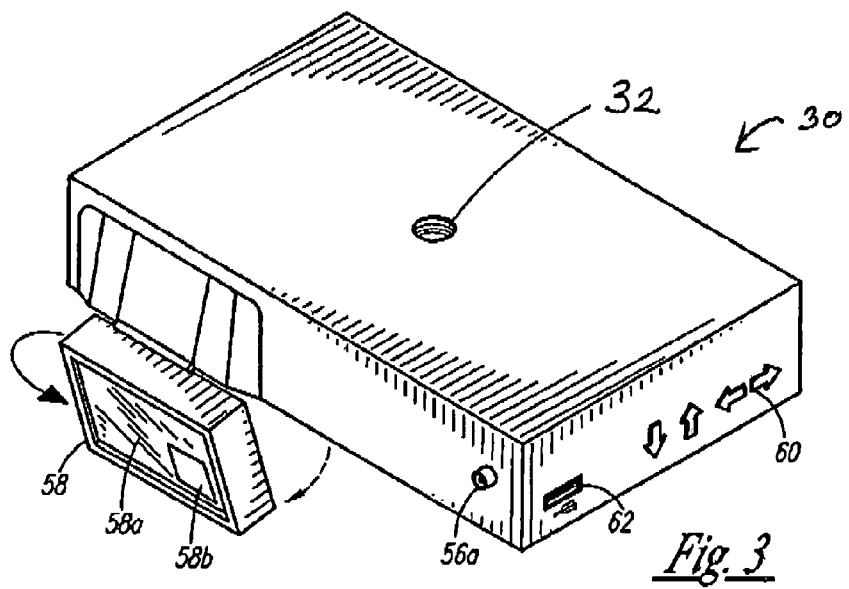
FIG. 3 is a reverse bottom perspective view of the electronic receiver unit.

FIG. 2 shows an electronic device 30 that the rotatable camera attachment 10 secures to. A receiver 32 comprised on the electronic device 30 accepts the rotating camera attachment attachment 10. FIG. 2 shows the receiver 32 in the form of male threads that mate with female threads (not shown) comprised on a rotatable camera attachment; however, the means for attachment is not limited to the male threads shown. Alternatively, female threads may be comprised on the electronic device 30, as shown in FIG. 3, to receive male threads that make up the securement means 24 on the camera attachment 10. The electronic device 30 typically comprises a lid 34, a base 36 and several electronic components, including a motion management system 38, a digital image processor 40, an audio processor 42, a transmission receiver 42, an LCD processor 46, an second audio processor 48 and a solid state storage 50. Fewer or more components may be comprised on the electronic device 30; however, the named components disclosed work in conjunction to achieve the primary functions of the rotating camera attachment 10, which is to record the information perceived by the rotating camera attachment 10.

Figure 4:
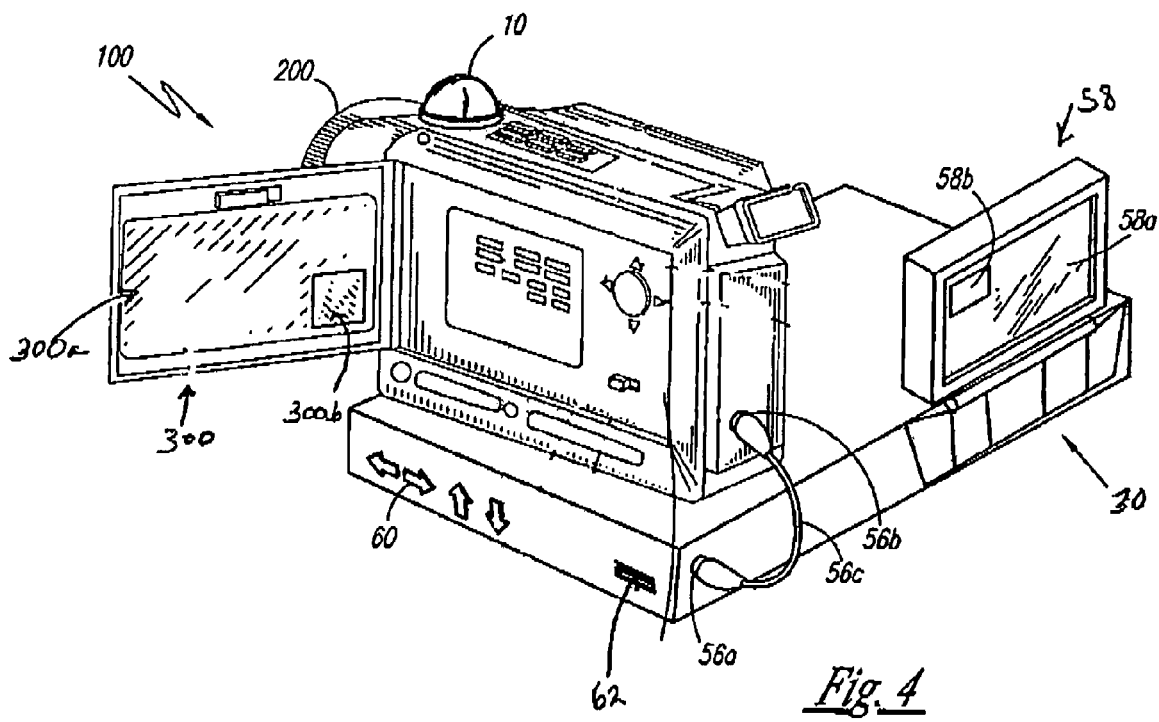
FIG. 4. is a perspective view of the present invention shown used in conjunction with an otherwise conventional digital camcorders.

The electronic device 30 is shown in FIGS. 3 and 4 in its full configuration for use with a camcorder 100. The camcorder can be controlled by the electronic device 30. The rotating camera attachment 10 is shown secured to the receiver comprised on the camcorder 100, but it may alternatively be secured to the receiver 32 (shown in FIG. 3 but hidden from view in FIG. 4). The camcorder 100 itself is electronically attached to a second receiver 56a comprised on the electronic device 30. A cable 56c attaches to a camcorder outlet 56b to transmit the images to the electronic device 30. The electronic device 30 may be additionally equipped with a visual screen 58. In its preferred form, the visual screen 58 is a liquid crystal display is capable of simultaneously showing the images captured by both the camera's lens 200 and the rotating camera attachment's lens (shown as 14 in FIG. 1). The display may show the images in the form of a picture-in-picture feature 58a, 58b or, alternatively, in a split-screen form. A control panel 60 permits control of the rotating camera attachment 10 when it is secured on the electronic device 30. The information perceived by the rotating camera 10 is stored either on the electronic device 30 or on an external recording source connected at a port 62. It is preferred that the port 62 is a USB port.

Figure 5:
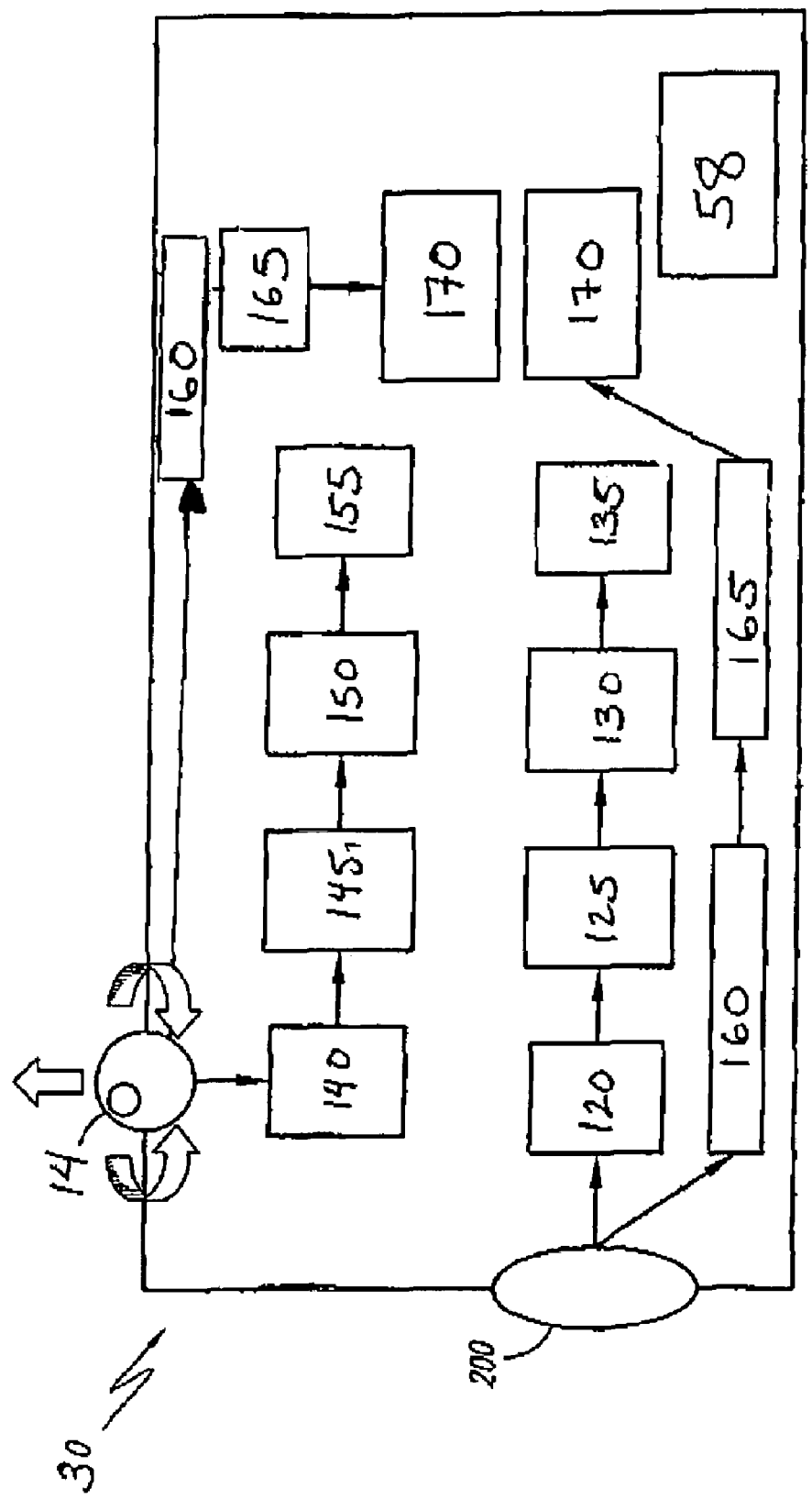
FIG. 5 is an electrical block diagram depicting the major electrical circuits as used with the dual lens system and method for digital cameras and camcorders.

FIG. 5 is an electrical block diagram that depicts the electrical circuitry for the dual lens system, wherein the method to utilize the rotatable camera attachment 10 with a digital camera or a camcorder 100 is shown. The image obtained by a conventional fixed or zoom lens 200 is processed first through a primary photo electric converter 120, then to a primary color signal processing unit 125, then to a primary difference processing unit 130 and finally to a primary image processing unit 135. In a likewise manner, the image obtained through the rotatable, peripheral lens 14 is processed by a separate, but identical, auxiliary photo electric converter 140 auxiliary color signal processing unit 145 auxiliary color difference processing unit 150 and auxiliary image processing unit 155. Both the conventional lens 200 and the rotating lens 18 are controlled by means of a lens driving circuit 160 which first feeds the corresponding information to a dual lens microprocessor 165 and then onto a recording and reproducing unit 170, such as a media recorder capable of recording on a tape, an optical media or on another means. During the recording and the playback, the user can either view the corresponding images on the picture-in-picture display screen 58 or, alternatively, the user can view the images on the display screen 300 comprised on the camcorder (as shown in FIG. 4).

It is envisioned that other styles and other configurations of the present invention may be incorporated into the present teachings. The particular configuration is shown for the purposes of clarity and in no way shall limit the scope of the present invention.

2. Operation of the Preferred Embodiment

In operation, the rotatable camera attachment can be attached to a digital or a camcorder camera to simultaneously record images around the primary one recorded by the digital or camcorder. Alternatively, the rotatable camera attachment is secured to the electronic device. The rotatable camera attachment perceives information, typically by activating the electronic device to an "on" state. The user controls the rotatable camera attachment by means of a control panel comprised on the electronic device to rotate it 360° about the horizontal axis and 180° about the vertical axis. The information is perceived through the lens, the audio perception means, and a microphone, wherein it is then sent to the electronic device for recording. It may alternatively be sent to the camcorder device or the digital camera for recording.

The foregoing descriptions of the specific embodiments of the present invention have been presented for the purposes of illustration and description only. They are not intended to be exhaustive nor are they intended to limit the invention to the precise forms disclosed and, obviously, many modifications and variations are possible in light of the above teaching. The embodiments were chosen and described in order to best explain the principles of the invention and its practical application, to thereby enable others skilled in the art to best utilize the invention and its various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. An apparatus comprising: a rotating camera attachment contained in a housing directly attached to the top portion of a camera; wherein said camera attachment comprising a lens and a means for wirelessly transmitting information perceived by said lens to an external electronic storage device; wherein said electronic storage device is directly connected to the bottom portion of said camera; wherein said lens is able to rotate horizontally 360 degrees; wherein said lens is able to rotate vertically less then 360 degrees; wherein said electronic storage device comprises a female threaded connector to connect housing to a tripod and a male threaded connector to connect the housing to said camera; said storage device further comprises a USB output, an audio and video input, a directional pad to control the functions of said lens, and a rotatable LCD display which shows the recorded footage from said lens.

2. The apparatus of claim 1, further comprising: a means for recording audio and video.

3. The apparatus of claim 2, wherein said means for recording audio sounds transmits said perceived information to said electronic storage device.

4. The apparatus of claim 1, further comprising a means for emitting a light.

5. The apparatus of claim 1, wherein said rotating camera attachment is capable of being unattached from said camera and directly attached to said electronic storage device.

6. The apparatus of claim 1, wherein said lens is able to rotate vertically about 180 degrees.

7. The apparatus of claim 1, further comprising an attachment means coupled to said rotating camera attachment capable of attaching said rotating camera attachment to an electronic storage device.

8. The apparatus of claim 1, comprising a method of recording information further comprising the steps of: attaching a camera to an electronic storage device; enabling said camera to perceive information; and, rotating said camera in at least a horizontal 360-degree fashion or at least vertically upwards in a 360-degree fashion; wherein said camera perceives information; and wherein said camera comprises a means for transmitting said perceived information to an electronic storage device.

9. The method of claim 8, wherein said electronic storage device records said perceived information.

10. The method of claim 8, wherein said rotating is performed by inputting information into said electronic devices.

11. The method of claim 8, wherein said electronic storage device displays said perceived information.

12. The method of claim 11, wherein said electronic storage device simultaneously displays another image while displaying said perceived information.

13. The method of claim 8, wherein said camera perceives visual information.

14. The method of claim 13, wherein said camera simultaneously perceives audio information.

* * * * *